Patented July 7, 1931

1,813,735

UNITED STATES PATENT OFFICE

CHARLES L. GABRIEL, OF TERRE HAUTE, INDIANA, ASSIGNOR TO COMMERCIAL SOLVENTS CORPORATION, OF TERRE HAUTE, INDIANA, A CORPORATION OF MARYLAND

LACQUERING COMPOSITION AND METHOD OF EMPLOYING SAME

No Drawing.  Application filed July 30, 1924.  Serial No. 729,163.

My invention relates to the application of lacquer to various surfaces, whereby a protective and decorative coating is obtained.

The adherence of lacquer films to surfaces of metal, wood, glass and similar substances is quite as good as the adherence of similar films of oleoresinous paints and varnishes. The tensile strength of a lacquer film, however, is much greater than the tensile strength of an ordinary oleoresinous film.

On account of the great tensile strength of lacquer films, particularly of films containing nitrocellulose or cellulose acetate, there is a tendency for a lacquer coating to peel off in pieces when fracture of the film has occurred owing to contact with sharp cutting bodies. Under similar circumstances oleoresinous films do not peel off readily on account of the low tensile strength or coherence of the film.

The tendency of lacquer films to peel may be overcome only by increasing the adherence of the film to the surface on which it is deposited. The adherence must be increased to a point where it is as great as the tensile strength. When this condition is reached the peeling tendency is overcome, and the only effect of a fracture or abrasion of the film is to remove the small piece in direct contact with the cutting or abrading body.

I have discovered that the interposition of a film of certain properties between the surface to be lacquered and the lacquer film will allow the production of a lacquer coating without peeling tendencies. My invention is of particular importance in the application of lacquers to smooth metal surfaces, such as are presented by automobile bodies, for the reason that unusual difficulty is sometimes experienced in securing a lacquer film that will adhere to a smooth iron surface.

The interposed film or "undercoating" must have the following properties:

It must be very adherent to the under-surface and to the lacquer film;

Its coefficient of expansion must approximate that of the under-surface and the lacquer film;

It must be noncorrosive to metal and wood;

It must have no chemical effect on the lacquer film.

Solutions of gum shellac in suitable volatile solvents, as for example, methylated spirits, may be used to deposit undercoatings, and lacquer films may be later applied to the shellac film which forms on evaporation of the volatile solvent. A film of pure gum shellac is not suitable for a lacquer undercoating for its adherence to the surface to be lacquered is no better than the adherence of a lacquer film.

I have discovered that gum shellac solutions may be modified to greatly increase the adherence of the dry shellac film to metal or other smooth surfaces by the addition of certain compounds which increase the adherence of the shellac to the surface without in any way modifying other desirable properties of the shellac film. I have found that a great number of high boiling non-volatile organic compounds, which are miscible with or soluble in shellac, are suitable for this purpose and I describe these compounds as "adhesivators".

The compounds which may be classed as "adhesivators" are almost identical with that class of high boiling nitrocellulose solvents known in the pyroxilin art as "plasticizers". Suitable "adhesivators" include the high boiling non-volatile alkyl esters of citric, malic, maleic, mucic, tartaric, phthalic, oxalic and phosphoric acids. Other nitrocellulose plasticizers, such as triphenyl phosphate, tricresyl phosphate and acetin are also suitable "adhesivators."

By experiment I have found that from two to ten per cent of an adhesivator based on the weight of shellac contained in volatile solvent produces a dry shellac film which adheres very strongly to a smooth under-surface and to a superimposed lacquer coating. This phenomenon is presumably due to the retention by the shellac of the adhesivator which is soluble in or miscible with it. In the proportions as described these adhesivators do not greatly soften the shellac film or make the same sticky or "tacky".

I prefer to use butyl tartrate, diethyl phthalate or dibutyl phthalate on account of the non-volatile nature of these adhesivators and their ready miscibility with shellac solutions.

In one form of my invention, as applicable to the finishing of automobile bodies, I proceed as follows:

Four pounds of gum shellac is dissolved in one gallon of ethyl alcohol and five ounces of dibutyl phthalate is added. This mixture is applied to the surface to be lacquered by means of a brush or spray gun. In some cases it is advisable to dilute the mixture by the addition of more alcohol. If the composition is to be sprayed it is advisable to add from one-half to one pound of normal butyl alcohol to the mixture. This will allow easier spraying and tend to produce a better shellac film.

When the shellac film is thoroughly dry, the lacquer coatings are placed on it in the usual manner by spraying, dipping or brushing.

It is, of course, obvious that the gum shellac need not be pure and may, in fact, contain large quantities of other gums.

Now, having described my invention, I desire to claim the following as new and novel:—

1. A cellulose lacquer undercoat composition comprising two to four pounds of gum shellac and two to ten ounces of dibutyl phthalate dissolved in one gallon of a volatile solvent.

2. A cellulose lacquer undercoat composition comprising two to four pounds of gum shellac, and two to ten ounces of dibutyl phthalate dissolved in one gallon of ethyl alcohol.

3. A cellulose lacquer undercoat composition comprising two to four pounds of gum shellac, two to ten ounces of an adhesivator, and one-half to one pound of butyl alcohol dissolved in one gallon of a volatile solvent.

4. A cellulose lacquer undercoat composition comprising two to four pounds of gum shellac, two to ten ounces of dibutyl phthalate, and one-half to one pound of butyl alcohol dissolved in one gallon of volatile solvent.

5. A cellulose lacquer undercoat composition comprising two to four pounds of gum shellac, two to ten ounces of dibutyl phthalate, and one-half to one pound of butyl alcohol dissolved in one gallon of ethyl alcohol.

CHARLES L. GABRIEL.